(12) United States Patent
Lindberg et al.

(10) Patent No.: US 9,503,688 B1
(45) Date of Patent: Nov. 22, 2016

(54) TECHNIQUES FOR AUTOMATICALLY SCHEDULING AND PROVIDING TIME-SHIFTED COMMUNICATION SESSIONS

(71) Applicant: Google Inc., Mountain View, CA (US)

(72) Inventors: Jonas Erik Lindberg, Stockholm (SE); Timothy Seeds Milligan, Woodinville, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/739,457

(22) Filed: Jun. 15, 2015

Related U.S. Application Data

(60) Provisional application No. 62/011,757, filed on Jun. 13, 2014.

(51) Int. Cl.
*H04N 7/15* (2006.01)
*G06Q 10/10* (2012.01)

(52) U.S. Cl.
CPC ............ *H04N 7/15* (2013.01); *G06Q 10/1095* (2013.01)

(58) Field of Classification Search
CPC .......... H04N 7/14; H04N 7/15; H04N 7/152; H04N 7/155; H04N 7/141; H04N 7/147
USPC .............................. 348/14.01–14.16; 709/204
See application file for complete search history.

(56) References Cited

U.S. PATENT DOCUMENTS

| | | | | |
|---|---|---|---|---|
| 2003/0014488 A1* | 1/2003 | Dalal | ...................... | H04L 29/06 709/204 |
| 2008/0120371 A1* | 5/2008 | Gopal | ................. | H04L 12/1831 709/204 |
| 2011/0063440 A1 | 3/2011 | Neustaedter et al. | | |
| 2013/0023279 A1* | 1/2013 | Poon | ....................... | H04W 4/14 455/456.1 |
| 2014/0198173 A1* | 7/2014 | Willig | ...................... | H04N 7/15 348/14.03 |

OTHER PUBLICATIONS

Carleton, J. et al., "Video Recording, Playback, and Streaming—A Powerful Business Tool: An Examination of uses in Healthcare, Education, and Financial Services," Frost & Sullivan White Paper Sponsored by Polycom, Inc., Accessed on Apr. 4, 2014, 11 pages.
Nawandah, M. et al., "Virtually Dining Together in Time-Shifted Environement: KIZUNA Design," CSCW '13, Computer-Mediated Communication, Feb. 23-27, 2013, San Antonio, Texas, pp. 779-788.
Robertson, N., "Piksel to Broadcast World Leaders Conference in Two-Day Webcast," PIKSEL, Nov. 7, 2013, 4 pages.
Tsujita, H. et al., "CU-Later: A Communication System Considering Time Difference," UbiComp'10, Sep. 26-29, 2010, Copenhagen, Denmark, 2 pages.

* cited by examiner

*Primary Examiner* — Melur Ramakrishnaiah
(74) *Attorney, Agent, or Firm* — Remarck Law Group PLC

(57) ABSTRACT

A computer-implemented technique can include receiving, at a server from an inviter computing device associated with an inviter user, a request to have a communication session with a plurality of invitee users at a scheduled time. The technique can include determining a time zone of each invitee user, and determining that a specific time zone of a specific invitee user differs by more than a predetermined amount from the time zone of the inviter user. The technique can include providing a time-shifted invitation to a specific invitee computing device associated with the specific invitee user, the time-shifted invitation being for a delayed time that is appropriate for the specific invitee user. The technique can also include receiving an audio/video communication stream corresponding to the communication session beginning at the scheduled time, and providing the audio/video communication stream to the specific invitee computing device at the delayed time.

20 Claims, 3 Drawing Sheets

TECHNIQUES FOR AUTOMATICALLY SCHEDULING AND PROVIDING TIME-SHIFTED COMMUNICATION SESSIONS

CROSS-REFERENCE TO RELATED APPLICATION

This application claims the benefit of U.S. Provisional Application No. 62/011,757, filed on Jun. 13, 2014. The entire disclosure of the above application is incorporated herein by reference.

FIELD

The present disclosure relates generally to communication sessions and, more particularly, to techniques for automatically scheduling and providing time-shifted audio/video communication sessions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A communication session, such as an audio and/or video conferencing communication session, can have invitee users (participants, viewers, etc.) that span multiple time zones. For example, a global or international business may have offices on multiple continents. While a communication session may be arranged by an inviter user for a scheduled time that is optimal for some invitee users, e.g., during work hours, the scheduled time may be a poor time for other invitee users in different time zones, e.g., in the middle of the night. Some communication sessions, however, do not require active participation by all the invitee users and/or do not concern time-sensitive information. For example only, the communication session may be a quarterly report by a director during which all other invitee users merely listen and take notes.

SUMMARY

A computer-implemented technique is presented. The technique can include receiving, at a server having one or more processors, a request from an inviter computing device, the request (i) being generated by an inviter user associated with the inviter computing device and (ii) indicating a request to have a communication session with a plurality of invitee users at a scheduled time. The technique can include determining, at the server, a time zone of each invitee user. The technique can include determining, at the server, that a specific time zone of a specific invitee user differs by more than a predetermined amount from the time zone of the inviter user. The technique can include providing, from the server to a specific invitee computing device associated with the specific invitee user, a time-shifted invitation for a delayed time after the scheduled time, the delayed time being an appropriate time for the specific invitee user with respect to the specific time zone. The technique can include receiving, at the server, an audio/video communication stream corresponding to the communication session and beginning at the scheduled time. The technique can also include providing, from the server to the specific invitee computing device, the audio/video communication stream at the delayed time.

In some embodiments, the technique further includes receiving, at the server, at least one annotation with respect to the audio/video communication stream from one or more invitee computing devices associated with a remainder of the plurality of invitee users, each annotation indicating an annotated time during the audio/video communication stream.

In other embodiments, the technique further includes: receiving, at the server, an input from the specific invitee user to transition the audio/video communication stream from a current position to a specific annotated time corresponding to a specific annotation, and transitioning, by the server, the audio/video communication stream from its current position to the specific annotated time indicated by the input.

In some embodiments, the at least one annotation is received from at least one of (i) original users participating in the communication session at its scheduled time and (ii) subsequent users receiving the audio/video communication stream at a time between the scheduled time and the delayed time.

In some embodiments, the technique further includes: providing, from the server, an invitation to each of one or more invitee computing devices associated with a remainder of the plurality of invitee users having time zones less than the predetermined amount from a time zone of the inviter user, wherein receipt of the invitation at each invitee computing device associated with the remainder of the plurality of users causes each invitee computing device to display a calendar event for the communication session at the scheduled time with respect to their time zones, and wherein receipt of the time-shifted invitation at the specific invitee computing device associated with the specific invitee user causes the specific invitee computing device to display a calendar event at the delayed time.

In other embodiments: (i) determining the time zone of each invitee user and (ii) determining that the specific time zone of the specific invitee user differs by more than the predetermined amount of time from the time zone of the inviter user are each performed automatically in response to receiving the request from the inviter user, and providing the time-shifted invitation to the specific invitee user is performed automatically in response to determining that the specific time zone of the specific invitee user differs by more than the predetermined amount of time from the time zone of the inviter user.

In some embodiments, providing the audio/video communication stream to the specific invitee computing device associated with the specific invitee user beginning at the delayed time further includes: buffering, at the server, the audio/video communication stream from the scheduled time until the delayed time to obtain a buffered audio/video communication stream, and providing, from the server to the specific invitee computing device, the buffered audio/video communication stream.

In other embodiments, the technique further includes: in response to receiving the audio/video communication stream, storing, at a memory of the server, the audio/video communication stream, retrieving, from the memory of the server, the audio/video communication stream, and providing, from the server to the specific invitee computing device, the audio/video communication stream at the scheduled time.

In some embodiments, the technique further includes in response to providing the audio/video communication stream to the specific invitee computing device, deleting, from the memory of the server, the audio/video communication stream.

In some embodiments, the technique further includes: determining, by the server, whether there is a common appropriate time for each of the inviter user and the plurality of invitee users; when there is the common appropriate time, providing, by the server to each of the inviter computing device and the plurality of invitee computing devices, a modified invitation for the video conference at the common appropriate time; and when there is no common appropriate time, providing, by the server to the specific invitee computing device, the delayed invitation.

A server having one or more processors configured to perform operations is also presented. The operations can include receiving, via a communication device of the server, a request from an inviter computing device, the request (i) being generated by an inviter user associated with the inviter computing device and (ii) indicating a request to have a communication session with a plurality of invitee users at a scheduled time. The operations can include determining a time zone of each invitee user. The operations can include determining that a specific time zone of a specific invitee user differs by more than a predetermined amount from the time zone of the inviter user. The operations can include providing, via the communication device, a time-shifted invitation to a specific invitee computing device associated with the specific invitee user, the time-shifted invitation being for a delayed time after the scheduled time, the delayed time being an appropriate time for the specific invitee user with respect to the specific time zone. The operations can include receiving, via the communication device, an audio/video communication stream corresponding to the communication session and beginning at the scheduled time. The operations can also include providing, via the communication device, the audio/video communication stream to the specific invitee computing device at the delayed time.

In some embodiments, the operations further include receiving, via the communication device, at least one annotation with respect to the audio/video communication stream from one or more invitee computing devices associated with a remainder of the plurality of invitee users, each annotation indicating an annotated time during the audio/video communication stream.

In other embodiments, the operations further include: receiving, via the communication device, an input from the specific invitee user to transition the audio/video communication stream from a current position to a specific annotated time corresponding to a specific annotation, and transitioning the audio/video communication stream from its current position to the specific annotated time indicated by the input.

In some embodiments, the at least one annotation is received from at least one of (i) original users participating in the communication session at its scheduled time and (ii) subsequent users receiving the audio/video communication stream at a time between the scheduled time and the delayed time.

In some embodiments, the operations further include: providing, via the communication device, an invitation to each of one or more invitee computing devices associated with a remainder of the plurality of invitee users having time zones less than the predetermined amount from a time zone of the inviter user, wherein receipt of the invitation at each invitee computing device associated with the remainder of the plurality of users causes each invitee computing device to display a calendar event for the communication session at the scheduled time with respect to their time zones, and wherein receipt of the time-shifted invitation at the specific invitee computing device associated with the specific invitee user causes the specific invitee computing device to display a calendar event at the delayed time.

In other embodiments: (i) determining the time zone of each invitee user and (ii) determining that the specific time zone of the specific invitee user differs by more than the predetermined amount of time from the time zone of the inviter user are each performed automatically in response to receiving the request from the inviter user, and providing the time-shifted invitation to the specific invitee user is performed automatically in response to determining that the specific time zone of the specific invitee user differs by more than the predetermined amount of time from the time zone of the inviter user.

In some embodiments, providing the audio/video communication stream to the specific invitee computing device associated with the specific invitee user beginning at the delayed time further includes: buffering the audio/video communication stream from the scheduled time until the delayed time to obtain a buffered audio/video communication stream, and providing, via the communication device, the buffered audio/video communication stream to the specific invitee computing device.

In other embodiments, the operations further include: in response to receiving the audio/video communication stream, storing, at a memory of the server, the audio/video communication stream, retrieving, from the memory of the server, the audio/video communication stream, and providing, via the communication device, the audio/video communication stream to the specific invitee computing device at the scheduled time.

In other embodiments, the operations further include in response to providing the audio/video communication stream to the specific invitee computing device, deleting, from the memory of the server, the audio/video communication stream.

In some embodiments, the operations further include: determining whether there is a common appropriate time for each of the inviter user and the plurality of invitee users; when there is the common appropriate time, providing, to each of the inviter computing device and the plurality of invitee computing devices, a modified invitation for the communication session at the common appropriate time; and when there is no common appropriate time, providing, to the specific invitee computing device, the delayed invitation.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
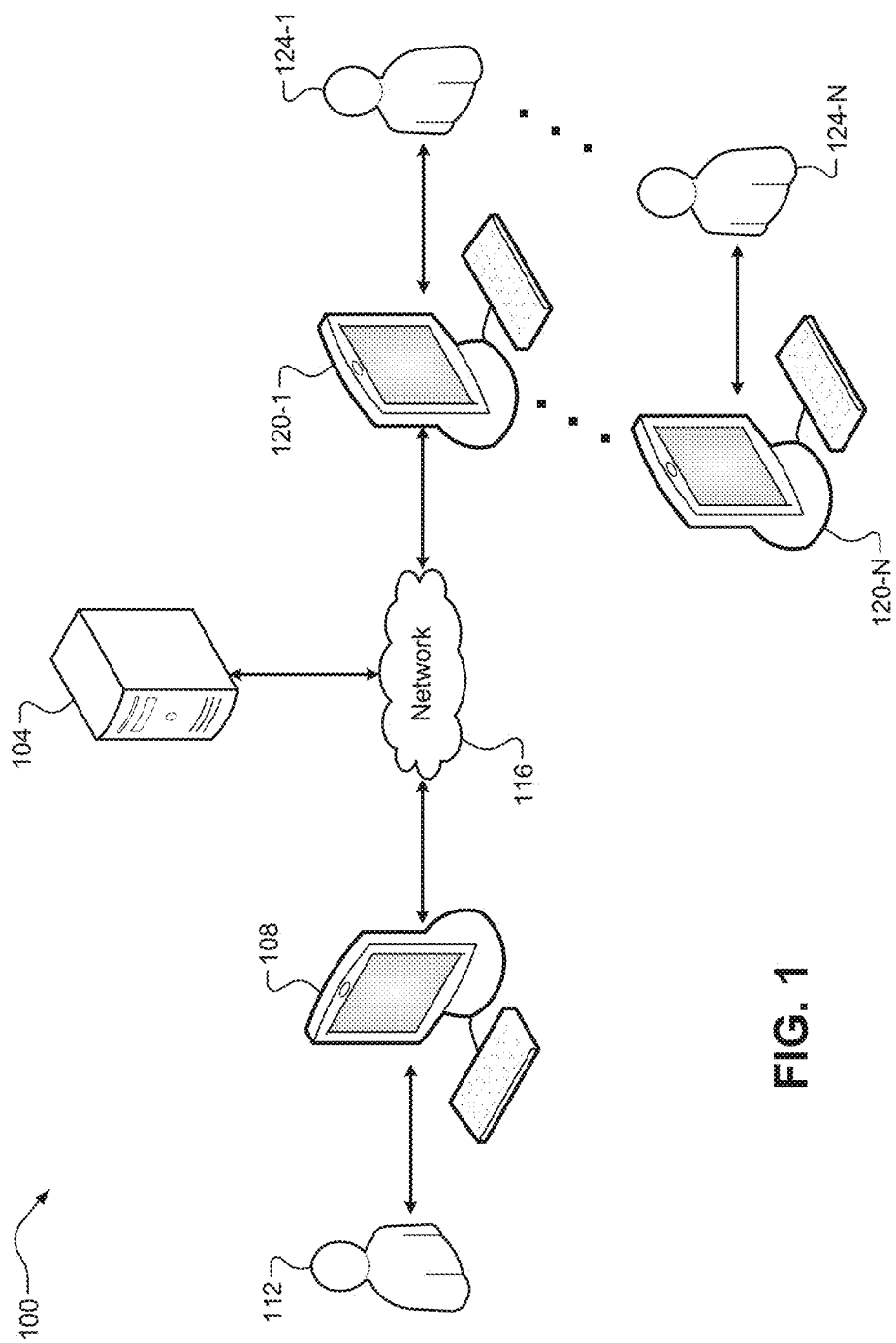
FIG. 1 is a schematic diagram of an example computing system including an example server according to some implementations of the present disclosure.

As mentioned above, there remains a need for improvement in the art of communication sessions (such as, but not limited to, audio or video conferencing sessions) across multiple time zones, particularly for communication sessions that do not require active participation by all the participants and/or do not concern time-sensitive information. In these situations, an audio/video communication stream corresponding to the communication session could be viewed/played at a later, preferred time by these other participants. Scheduling and providing/distributing the audio/video communication stream corresponding to the communication session to multiple users across multiple time zones, however, can be a complex task. For example, a user located in an inappropriate time zone for a scheduled time for a communication session may be required to view/participate in the communication session at the inappropriate time or may be required to manually schedule (either themselves or via the inviter user) a time-shifted communication session for a later, more appropriate time. While the term "time zone" as used above refers to physical time zone of a particular user with respect to Coordinated Universal Time (UTC), there may be users in the same physical time zone that have different hours of availability. Thus, the use of the term "time zone" herein can refer to both the physical time zone of a particular user as well as hours of availability for the particular user.

Accordingly, techniques are presented for automatically scheduling and providing time-shifted audio/video communication sessions. A server can receive a request from an inviter computing device associated with an inviter user. The request can represent a request to have a communication session with a plurality of invitee users at a scheduled time. It will be appreciated that all remaining actions can be performed by the server automatically in response to receiving this request, thereby creating an automated and user-friendly process for scheduling and providing communication sessions across multiple time zones. In some implementations, however, these actions may only be performed by the server in response to determining that there is no common appropriate time for each of the inviter user and the plurality of invitee users. For example only, this common appropriate time may be during common working hours and when everyone is available on their calendars. If the common appropriate time does exist, a modified invitation could be provided to each of the inviter user and the plurality of invitee users instead of providing both the original invitations and time-shifted invitations.

One possible action by an invitee user may be accepting the invitation, the modified invitation, or the time-shifted invitation for the communication session. In some implementations, each invitee user may be able to manually change the time of the time-shifted invitation, thereby altering the delayed time at which the audio/video communication stream will be provided to their invitee computing device. This "rescheduling," however, may be limited to a predefined amount of time, such as a set number of hours or days after the scheduled time. For example only, the rescheduling may be limited to no later than a latest delayed time that one of the other invitee users is being provided the audio/video communication stream. In response to receiving the request for the communication session at the scheduled time, the server can determine a time zone of each of the invitee users. The server can then compare the time zone of each invitee user to a time zone of the inviter user. This time zone determination/comparison may also be performed as part of determining whether the common appropriate time exists for each of the inviter user and the plurality of invitee users.

When no common appropriate time exists, the server can provide an invitation for the scheduled time to invitee computing devices associated with invitee users having time zones that differ by less than a predetermined amount from the time zone of the inviter user. When the time zone of a specific invitee user differs by more than a predetermined amount from the time zone of the inviter user, however, the server can provide a time-shifted invitation to an invitee computing device associated with the specific invitee user. The time-shifted invitation can be for a delayed time that is later than the scheduled time. It will be appreciated that the term "time-shifted" as used herein refers to a time later than the scheduled time and not the scheduled time in a later time zone. The server can then provide an audio/video communication stream corresponding to the communication session to the invitee computing devices at the appropriate time. Providing the audio/video communication stream at the delayed time can include storing, retrieving, outputting, and (optionally) deleting the audio/video communication stream, or can include buffering the audio/video communication stream from the scheduled time until the delayed time.

The term "buffering" as used herein can refer to inserting or otherwise causing a delay before playing (or providing) an audio/video communication stream. This may include temporarily storing the audio/video communication stream in a memory for subsequent retrieval, output, and deletion from the memory, all after the delay has elapsed or expired. This may be different than merely storing the audio/video communication stream in that the buffered audio/video communication stream may not be accessible from the memory until the delay has elapsed or expired. In other words, the buffered audio/video communication stream represents a time-delayed version of the audio/video communication stream provided at the scheduled time. The deletion of the audio/video communication stream from the memory may be performed after either predetermined amount of time after the delayed time (e.g., a few hours) or in response to the end of the audio/video communication stream by a last viewing invitee user.

Referring now to FIG. 1, a schematic diagram of a computing system 100 is illustrated. The computing system 100 can include an example server 104 according to some implementations of the present disclosure. It should be appreciated that the term "server" as used herein can refer to a hardware computer server and can also refer to both a single server and a plurality of servers operating in a parallel or distributed architecture. The server 104 can communicate with an inviter computing device 108 associated with an inviter user 112 via a network 116. The network 116 can include a local area network (LAN), a wide area network (WAN) (e.g., the Internet), or a combination thereof. The server 104 can also communicate with one or more invitee computing devices 120-1 . . . 120-N (N≥1, collectively "invitee computing devices 120") associated with one or more invitee users 124-1 . . . 124-N (collectively "invitee users") via the network 116.

In one example implementation, the inviter user 112 and some of the invitee users 124 may be located in the Pacific Standard Time (PST) time zone, but one of the invitee users

124 may be located in the Central European Time (CET) time zone. The inviter user 112 may generate a request via the inviter computing device 108 to have a communication session with the invitee users 124 at a scheduled time of 3:00 PM PST. This scheduled time of 3:00 PM PST, however, corresponds to a time of 2:00 AM CET for the one invitee user 124, which is in the middle of the night and thus is not an appropriate time for him/her to have a communication session. Thus, in response to receiving the request from the inviter computing device 108, the server 104 can automatically schedule and provide a time-shifted communication session for the invitee user 124 located in the CET time zone according to the techniques of the present disclosure, which are described in greater detail below.

Figure 2:
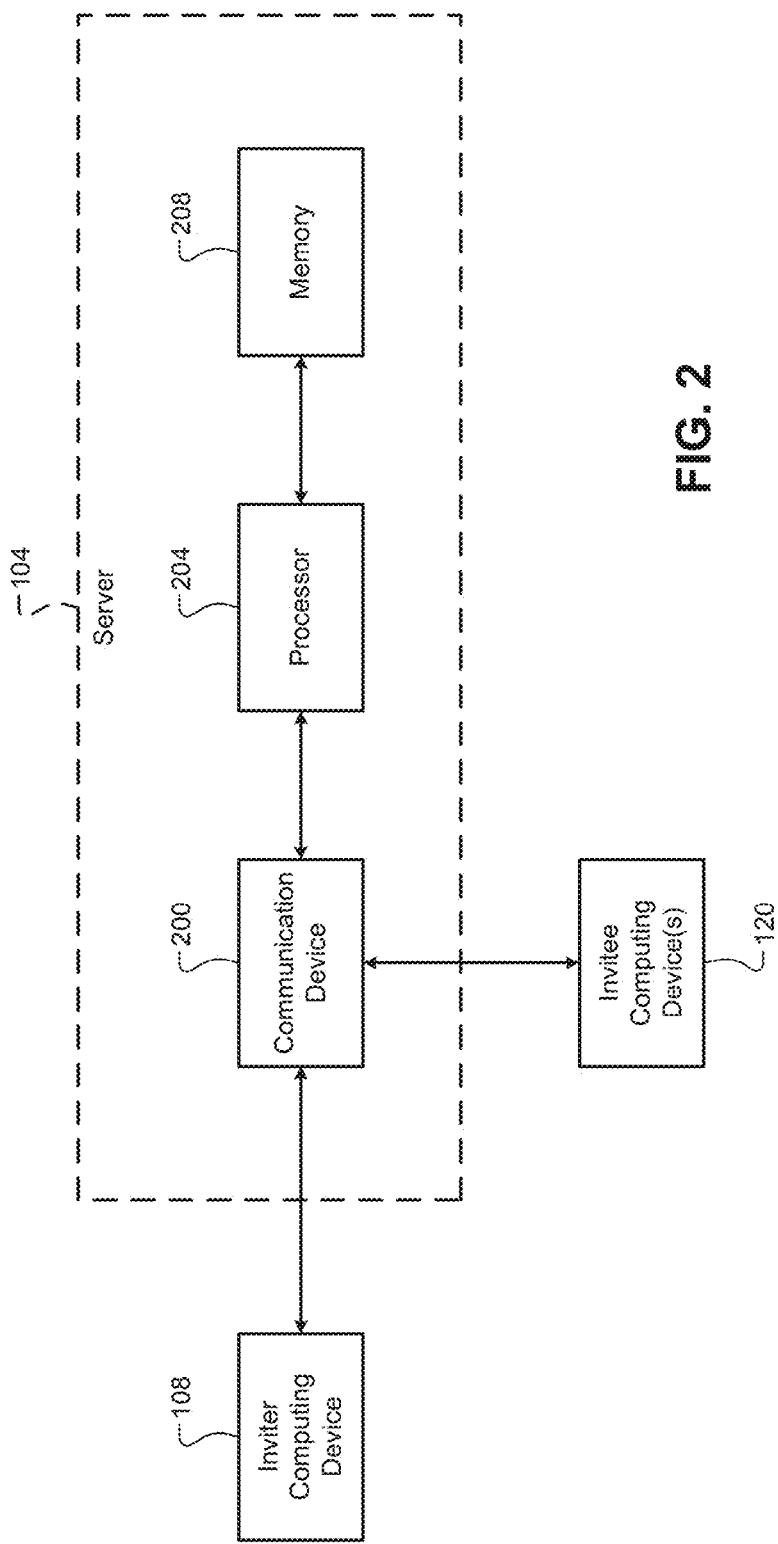
FIG. 2 is a functional block diagram of the example server of FIG. 1.

Referring now to FIG. 2, a functional block diagram of the example server 104 is illustrated. The server 104 can include a communication device 200, a processor 204, and a memory 208. The communication device 200 can include any suitable components (e.g., a transceiver) configured for communication with other computing devices via the network 116. The processor 204 can control operation of the server 104, such as functions including, but not limited to, loading/executing an operating system, controlling communication via the communication device 200, and controlling read/write operations at the memory 208. The memory 208 can be any suitable storage medium (flash, hard disk, etc.) configured to store information. Depending on the configuration of the techniques of the present disclosure, the memory 208 may be a temporary storage medium (e.g., random access memory (RAM)) for temporary buffering as opposed to a persistent storage medium. The processor 204 can also be configured to perform operations for at least a portion of the techniques of the present disclosure, which are described in greater detail below.

Initially, the server 104 can receive a request from the inviter computing device 108. The request can (i) be generated by the inviter user 112 at the inviter computing device 108 and (ii) indicate a request to have a communication session with the invitee users 124 at a scheduled time. For example only, the inviter user 112 may create an event in a calendar via the inviter computing device 108 and, in response to creating the calendar event, the inviter computing device 108 may generate and transmit (e.g., automatically) the request to the server 104. In response to receiving the request, the server 104 can determine a time zone of each invitee user 124. For example only, the time zone of the inviter user 112 is the PST time zone, and the scheduled time is 3:00 PM PST. The time zones of the various users can be determined using any suitable technique, such as their geo-location or a time zone stored in their user profile.

The server 104 can then compare the time zones of the invitee users 124 to the time zone of the inviter user 112. Specifically, the server 104 can determine whether any of the time zones of the invitee users 124 differs by more than a predetermined amount from the time zone of the inviter user 112. This predetermined amount can be based on an appropriate time for participating in a communication session. In other words, the predetermined amount may represent a maximum hour difference for participating in the communication session at the scheduled time. For example only, the predetermined amount may be a few hours. In response to determining that a specific invitee user 124 is in a time zone that does not differ by more than the predetermined amount from the time zone of the inviter user, the server 104 can provide an invitation (e.g., automatically) for the communication session to their specific invitee computing device 120. Receiving the invitation can cause the specific invitee computing device 120 to display a calendar event for the communication session at the scheduled time. It will be appreciated that this scheduled time is still with respect to the specific invitee user's time zone, e.g., if their time zone is slightly different than the inviter user's time zone.

In response to determining that a specific invitee user 124 is in a time zone that differs by more than the predetermined amount from the time zone of the inviter user 112, the server 104 can provide (e.g., automatically) a time-shifted invitation for the communication session to their specific invitee computing device 120. The time-shifted invitation can be for a delayed time after the scheduled time. The delayed time can be an appropriate time for the specific invitee user 124 with respect to their specific time zone. For example only, if the specific invitee user's time zone is the CET time zone and the scheduled time is 3:00 PM PST, the delayed time may be 10:00 AM CET (11:00 PM PST), which is eight hours after the scheduled time. Receiving the time-shifted invitation can cause the specific invitee computing device 120 to display a calendar event for the communication session at the delayed time. In this manner, users in time zones that are not appropriate for participating in the communication session at the scheduled time can be automatically scheduled for the time-shifted communication session without their input.

In one implementation, a single delayed time can be determined for all invitee users 124 for which the scheduled time is inappropriate. This single delayed time may be used across multiple time zones. For example, if the scheduled time is 4:00 PM PST and some invitee users 124 are in the Eastern Standard Time (EST) time zone (4:00 PM PST=7:00 PM EST) and other invitee users 124 are in the CET time zone, the scheduled time may be inappropriate. The single delayed time may be determined to be 8:30 AM EST and 4:30 PM CET, which corresponds to a 13.5 hour delay from the scheduled time. In another implementation, multiple delayed times can be determined for groups of invitee users 124 in different time zones. For example, using the same times/time zones above, a first delayed time of 10:00 AM EST may be used for invitee users 124 in the EST time zone (a 15 hour delay from the 4:00 PM PST scheduled time) and a second delayed time of 10:00 AM CET may be used for invitee users 124 in the CET time zone (a 7 hour delay from the 4:00 PM PST scheduled time). In yet another implementation, different delayed times can be determined to each invitee user 124. In addition to their time zone, other factors to be used in determining the delayed time for each invitee user 124 can be their availability, e.g., via their calendar. For example, 10:00 AM EST may be appropriate for some invitee users 124 in the EST time zone, but one of these invitee users 124 may be busy that morning, and thus a delayed time of 2:00 PM EST may be appropriate for them (a 19 hour delay from the 4:00 PM PST scheduled time).

Beginning at the scheduled time, the server 104 can receive an audio/video communication stream corresponding to the communication session. The audio/video communication stream may be generated and transmitted by the inviter computing device 108 or another suitable communication session system (e.g., a video and/or audio conferencing device). The server 104 can then provide the audio/video communication stream to each of the invitee computing devices 120 at their appropriate times. For invitee users 124 in appropriate time zones for participation at the scheduled time, the server 104 can provide the audio/video communication stream to the invitee computing devices 120 directly (e.g., immediately) upon receiving the audio/video communication stream. In some implementations, providing the audio/video communication stream can be in response to each invitee user 124 accepting their invitation (or time-shifted invitation) to the communication session. Alternatively, the audio/video communication stream may be provided automatically. For invitee users 124 scheduled for the delayed time, the server 104 can provide the audio/video communication stream to the invitee computing devices 120 at the delayed time. Upon receiving the audio/video communication stream, each invitee computing device 120 can display the audio/video communication stream to its respective invitee user 124.

In one implementation, the server 104 can buffer the audio/video communication stream from the scheduled time until the delayed time to obtain a buffered audio/video communication stream, and the server 104 can then provide the buffered audio/video communication stream to the invitee computing devices 124 at the delayed time. This may also be referred to as a long or extended buffering. In this manner, the audio/video communication stream may never be accessible at the server 124, such as for user privacy purposes. Alternatively, in another implementation the server 104 can store the audio/video communication stream at its memory 208 upon receiving the audio/video communication stream. The server 104 can then retrieve the audio/video communication stream from the memory 208 in order to provide the audio/video communication stream to the invitee computing devices 120. After the audio/video communication stream has been retrieved and provided to any invitee computing devices 120 at the delayed time, the server 104 may then delete the audio/video communication stream from the memory 208, such as for user privacy purposes.

During playback of the audio/video communication stream at an invitee computing device 120, the server 104 can receive annotations with respect to the audio/video communication stream from the invitee computing devices 120. Each annotation can be made by a respective invitee user 124 and can indicate a specific time during the communication session. The annotations can be made by invitee users 124 that are original viewers of the audio/video communication stream (at the scheduled time) or subsequent viewers of the audio/video communication stream but before the delayed time (after the scheduled time and before the delayed time). For example, an invitee user 124 may generate an annotation when a specific person is speaking during the communication session. Alternatively, for example, an invitee user 124 may generate an annotation when a specific topic is being discussed. After the audio/video communication stream has been annotated, invitee users 124 that are playing back the annotated audio/video communication stream at the delayed time can then transition between the specific times indicated by the annotations. In other words, the later-viewing invitee users 124 can jump to the specific times as annotated by the earlier-viewing invitee users 124, thereby saving themselves time.

Other potential user controls may be implemented for use during playback of the audio/video communication stream. For example, fast-forward and rewind controls may be accessible. When the long/extended buffered audio/video communication stream is being utilized, however, rewind of the audio/video communication stream may only be available to a current playback time, such as after previously fast-forwarding. Another example user control can include skipping between different speakers or skipping to a previous/next speaker, which can involve speech recognition techniques. For example, the user may be able to use such controls to quickly/efficiently proceed through a question and answer session of the video conference.

Figure 3:
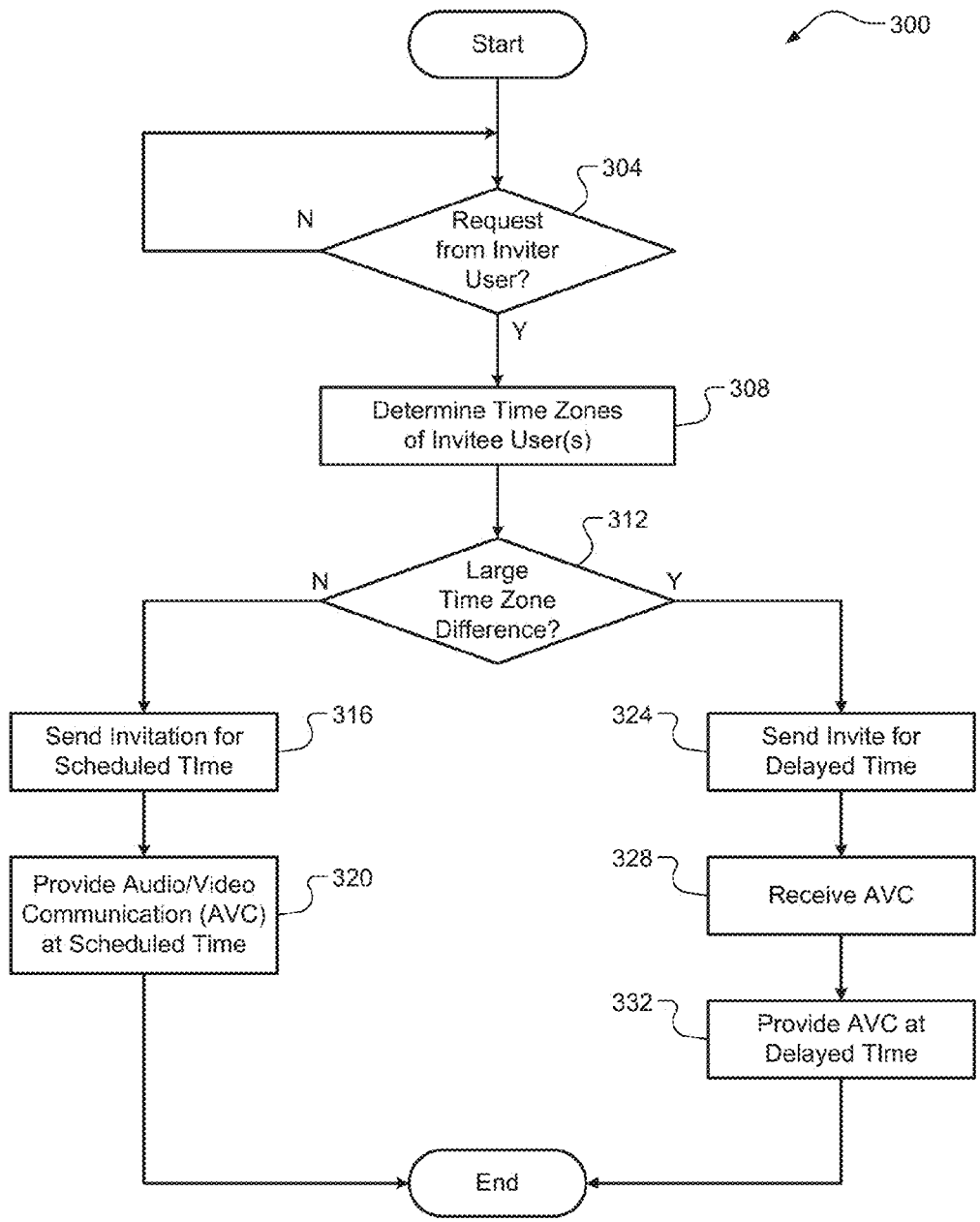
FIG. 3 is a flow diagram of an example technique for automatically scheduling and providing time-shifted communication sessions.

Referring now to FIG. 3, a flow diagram of an example technique 300 for automatically scheduling and providing time-shifted communication sessions is illustrated. At 304, the server 104 can detect a request by the inviter user 112 from the inviter computing device 108 to have a communication session with the invitee users 124 at a scheduled time. In one implementation, this request may be generated and automatically transmitted to the server 104 in response to an input by the inviter user 112 at the inviter computing device 108. For example, this input may be the creation of an event in a calendar. When the request is received, the technique 300 can proceed to 308. When the request is not received, the technique 300 can end or return to 304. At 308, the server 104 can determine a time zone of each invitee user 124.

At 312, the server 104 can determine whether a specific time zone of a specific invitee user 124 differs by more than a predetermined amount from the time zone of the inviter user 112. If the specific time zone for the specific invitee user 124 does not differ from the time zone of the inviter user 112 by more than the predetermined amount, the technique 300 can proceed to 316. At 316, the server 104 can provide an invitation for the communication session at the scheduled time to the invitee computing devices 120. At 320, the server 104 can receive an audio/video communication stream of the communication session beginning at the scheduled time and provide the audio/video communication stream of the communication session (e.g., immediately) to the invitee computing devices 120. The technique 300 can then end or return to 304.

If the specific time zone for the specific invitee user 124 differs from the time zone of the inviter user 112 by more than the predetermined amount, the technique 300 can proceed to 324. At 324, the server 104 can provide a time-shifted invitation for the communication session to a specific invitee computing device 120 associated with the specific invitee user 124, the time-shifted invitation being for a delayed time after the scheduled time, the delayed time being an appropriate time for the specific invitee user 124 with respect to their specific time zone. At 328, the server 104 can receive the audio/video communication stream of the communication session beginning at the scheduled time. At 332, the server 104 can provide the audio/video communication stream to the specific invitee computing device 124 at the delayed time. The technique 300 can then end or return to 304.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method, comprising:
    receiving, at a server having one or more processors, a request from an inviter computing device, the request (i) being generated by an inviter user associated with the inviter computing device and (ii) indicating a request to have a communication session with a plurality of invitee users at a scheduled time;
    determining, at the server, a time zone of each invitee user;
    determining, at the server, that a specific time zone of a specific invitee user differs by more than a predetermined amount from the time zone of the inviter user;
    providing, from the server to a specific invitee computing device associated with the specific invitee user, a time-shifted invitation for a delayed time after the scheduled time, the delayed time being an appropriate time for the specific invitee user with respect to the specific time zone;
    receiving, at the server, an audio/video communication stream corresponding to the communication session and beginning at the scheduled time; and
    providing, from the server to the specific invitee computing device, the audio/video communication stream at the delayed time.

2. The computer-implemented method of claim 1, further comprising receiving, at the server, at least one annotation with respect to the audio/video communication stream from one or more invitee computing devices associated with a remainder of the plurality of invitee users, each annotation indicating an annotated time during the audio/video communication stream.

3. The computer-implemented method of claim 2, further comprising:
    receiving, at the server, an input from the specific invitee user to transition the audio/video communication stream from a current position to a specific annotated time corresponding to a specific annotation; and
    transitioning, by the server, the audio/video communication stream from its current position to the specific annotated time indicated by the input.

4. The computer-implemented method of claim 2, wherein the at least one annotation is received from at least one of (i) original users participating in the communication session at its scheduled time and (ii) subsequent users receiving the audio/video communication stream at a time between the scheduled time and the delayed time.

5. The computer-implemented method of claim 1, further comprising:
    providing, from the server, an invitation to each of one or more invitee computing devices associated with a remainder of the plurality of invitee users having time zones less than the predetermined amount from a time zone of the inviter user,
    wherein receipt of the invitation at each invitee computing device associated with the remainder of the plurality of users causes each invitee computing device to display a calendar event for the communication session at the scheduled time with respect to their time zones, and
    wherein receipt of the time-shifted invitation at the specific invitee computing device associated with the specific invitee user causes the specific invitee computing device to display a calendar event at the delayed time.

6. The computer-implemented method of claim 1, wherein:
    (i) determining the time zone of each invitee user and (ii) determining that the specific time zone of the specific invitee user differs by more than the predetermined amount of time from the time zone of the inviter user are each performed automatically in response to receiving the request from the inviter user; and
    providing the time-shifted invitation to the specific invitee user is performed automatically in response to determining that the specific time zone of the specific invitee user differs by more than the predetermined amount of time from the time zone of the inviter user.

7. The computer-implemented method of claim 1, wherein providing the audio/video communication stream to the specific invitee computing device associated with the specific invitee user beginning at the delayed time further includes:
    buffering, at the server, the audio/video communication stream from the scheduled time until the delayed time to obtain a buffered audio/video communication stream; and
    providing, from the server to the specific invitee computing device, the buffered audio/video communication stream.

8. The computer-implemented method of claim 1, further comprising:
    in response to receiving the audio/video communication stream, storing, at a memory of the server, the audio/video communication stream;
    retrieving, from the memory of the server, the audio/video communication stream; and
    providing, from the server to the specific invitee computing device, the audio/video communication stream at the scheduled time.

9. The computer-implemented method of claim 8, further comprising in response to providing the audio/video communication stream to the specific invitee computing device, deleting, from the memory of the server, the audio/video communication stream.

10. The computer-implemented method of claim 1, further comprising:
    determining, by the server, whether there is a common appropriate time for each of the inviter user and the plurality of invitee users;
    when there is the common appropriate time, providing, by the server to each of the inviter computing device and the plurality of invitee computing devices, a modified invitation for the communication session at the common appropriate time; and
    when there is no common appropriate time, providing, by the server to the specific invitee computing device, the delayed invitation.

11. A server having one or more processors configured to perform operations comprising:
    receiving, via a communication device of the server, a request from an inviter computing device, the request (i) being generated by an inviter user associated with the inviter computing device and (ii) indicating a request to have a communication session with a plurality of invitee users at a scheduled time;
    determining a time zone of each invitee user;
    determining that a specific time zone of a specific invitee user differs by more than a predetermined amount from the time zone of the inviter user;
    providing, via the communication device, a time-shifted invitation to a specific invitee computing device associated with the specific invitee user, the time-shifted invitation being for a delayed time after the scheduled time, the delayed time being an appropriate time for the specific invitee user with respect to the specific time zone;

receiving, via the communication device, an audio/video communication stream corresponding to the communication session beginning at the scheduled time; and providing, via the communication device, the audio/video communication stream to the specific invitee computing device at the delayed time.

12. The server of claim 11, wherein the operations further comprise receiving, via the communication device, at least one annotation with respect to the audio/video communication stream from one or more invitee computing devices associated with a remainder of the plurality of invitee users, each annotation indicating an annotated time during the audio/video communication stream.

13. The server of claim 12, wherein the operations further comprise:

receiving, via the communication device, an input from the specific invitee user to transition the audio/video communication stream from a current position to a specific annotated time corresponding to a specific annotation; and transitioning the audio/video communication stream from its current position to the specific annotated time indicated by the input.

14. The server of claim 12, wherein the at least one annotation is received from at least one of (i) original users participating in the communication session at its scheduled time and (ii) subsequent users receiving the audio/video communication stream at a time between the scheduled time and the delayed time.

15. The server of claim 11, wherein the operations further comprise:

providing, via the communication device, an invitation to each of one or more invitee computing devices associated with a remainder of the plurality of invitee users having time zones less than the predetermined amount from a time zone of the inviter user, wherein receipt of the invitation at each invitee computing device associated with the remainder of the plurality of users causes each invitee computing device to display a calendar event for the communication session at the scheduled time with respect to their time zones, and wherein receipt of the time-shifted invitation at the specific invitee computing device associated with the specific invitee user causes the specific invitee computing device to display a calendar event at the delayed time.

16. The server of claim 11, wherein:

(i) determining the time zone of each invitee user and (ii) determining that the specific time zone of the specific invitee user differs by more than the predetermined amount of time from the time zone of the inviter user are each performed automatically in response to receiving the request from the inviter user; and providing the time-shifted invitation to the specific invitee user is performed automatically in response to determining that the specific time zone of the specific invitee user differs by more than the predetermined amount of time from the time zone of the inviter user.

17. The server of claim 11, wherein providing the audio/video communication stream to the specific invitee computing device associated with the specific invitee user beginning at the delayed time further includes:

buffering the audio/video communication stream from the scheduled time until the delayed time to obtain a buffered audio/video communication stream; and providing, via the communication device, the buffered audio/video communication stream to the specific invitee computing device.

18. The server of claim 12, wherein the operations further comprise:

in response to receiving the audio/video communication stream, storing, at a memory of the server, the audio/video communication stream;

retrieving, from the memory of the server, the audio/video communication stream; and providing, via the communication device, the audio/video communication stream to the specific invitee computing device at the scheduled time.

19. The server of claim 18, wherein the operations further comprise in response to providing the audio/video communication stream to the specific invitee computing device, deleting, from the memory of the server, the audio/video communication stream.

20. The server of claim 11, wherein the operations further comprise:

determining whether there is a common appropriate time for each of the inviter user and the plurality of invitee users;

when there is the common appropriate time, providing, to each of the inviter computing device and the plurality of invitee computing devices, a modified invitation for the communication session at the common appropriate time; and when there is no common appropriate time, providing, to the specific invitee computing device, the delayed invitation.

* * * * *